INVENTORS.
JOSHUA LADELL
KURT LOWITZSCH
BY
AGENT.

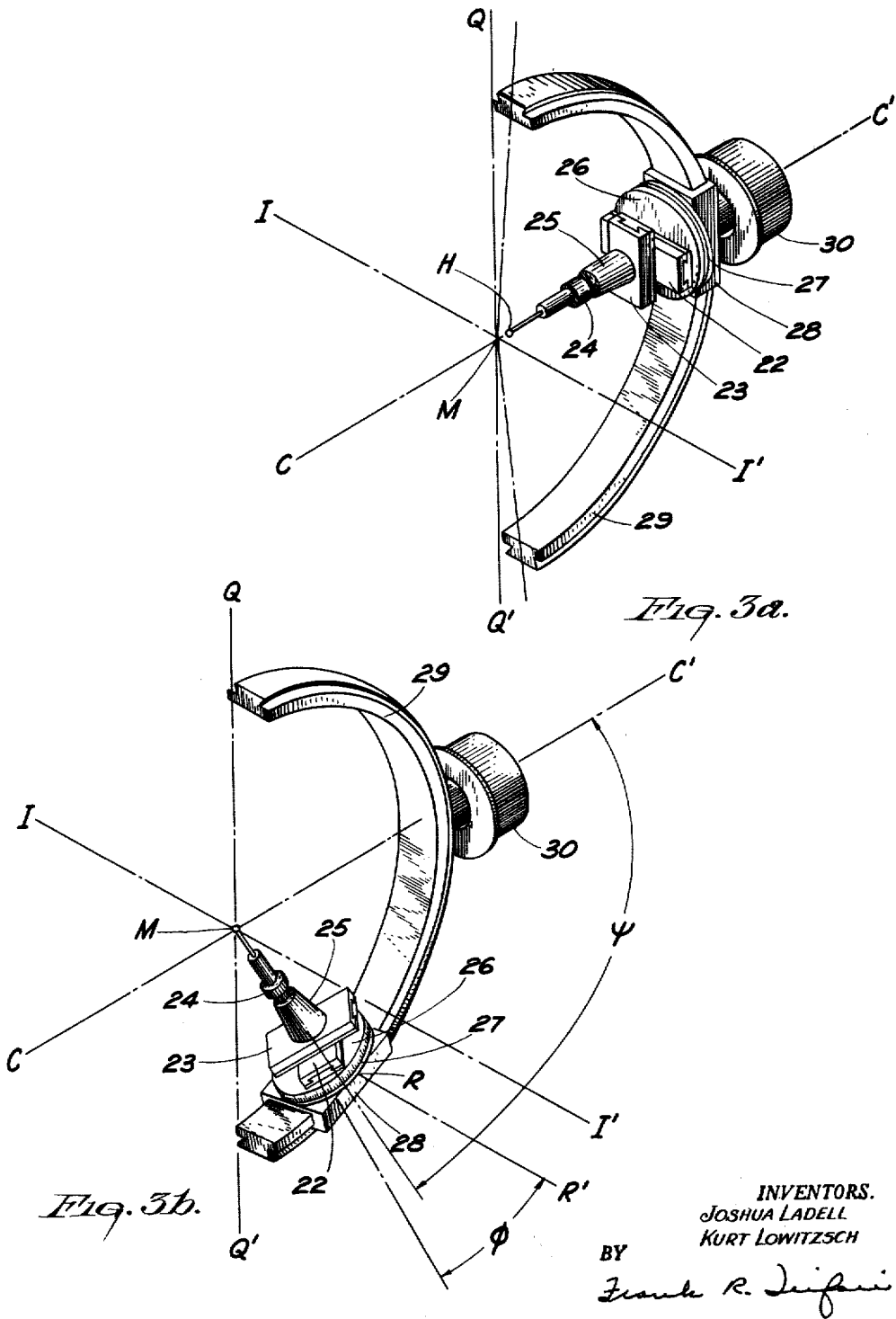

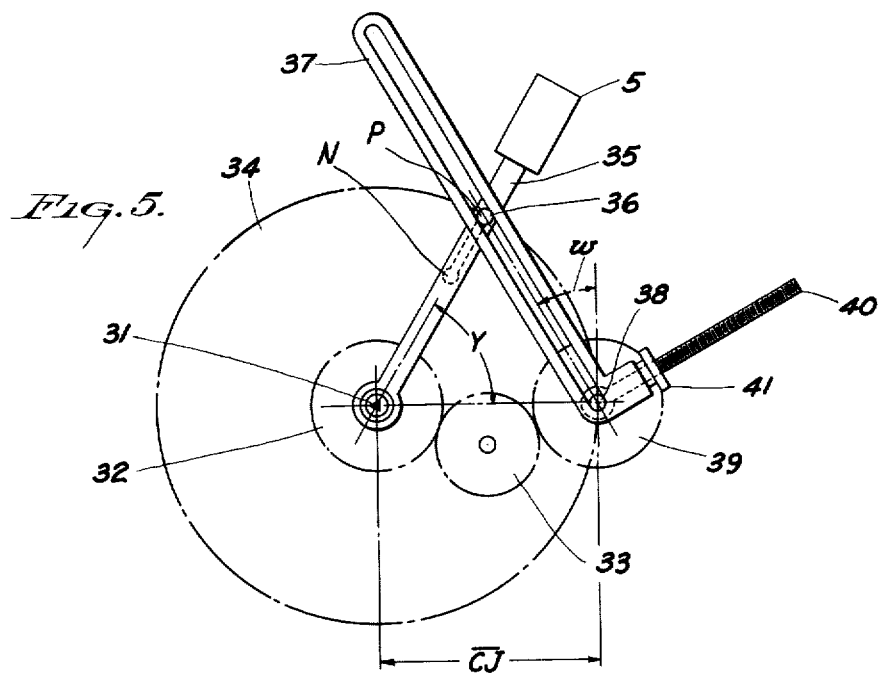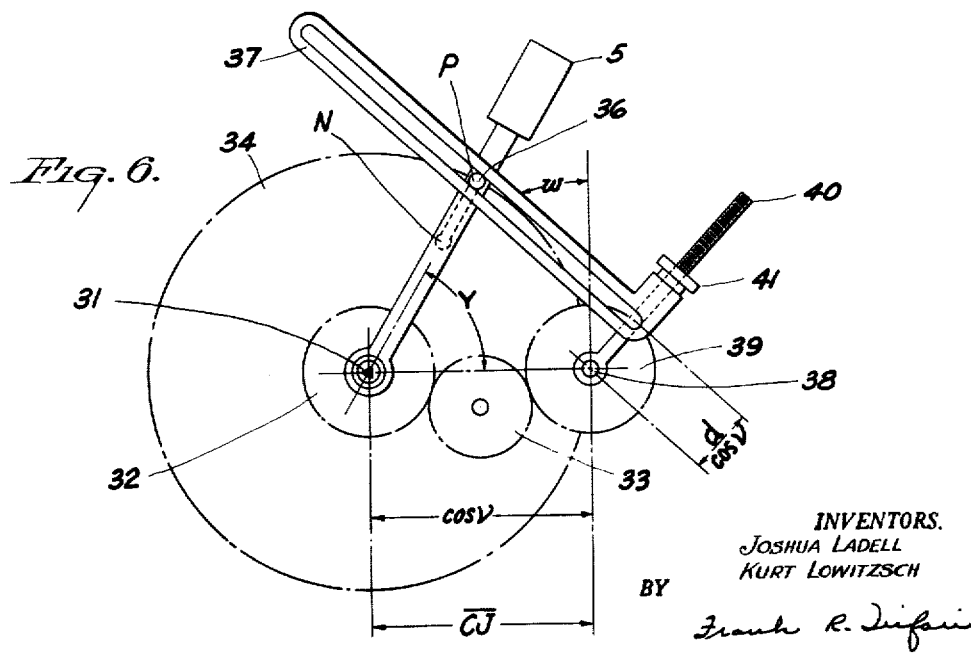

INVENTORS.
JOSHUA LADELL
KURT LOWITZSCH
BY
AGENT.

3,105,901
X-RAY DIFFRACTION DEVICE WITH 360° ROTATABLE SPECIMEN HOLDER

Joshua Ladell, Flushing, and Kurt Lowitzsch, Yonkers, N.Y., assignors to North American Philips Company, Inc., New York, N.Y., a corporation of Delaware
Filed Mar. 30, 1959, Ser. No. 803,008
14 Claims. (Cl. 250—51.5)

Our invention relates to apparatus for the structure determination of a crystal. More particularly, the invention relates to apparatus for automatically recording, systematizing and indexing diffraction effects from a crystal specimen irradiated by X-rays and other penetrating radiation.

In order to determine the structure of crystalline material it is necessary to measure the intensities of the diffraction maxima (i.e., crystal reflections which occur in quantized directions governed by the geometry of the crystal lattice). To utilize these intensity measurements it is further necessary to identify the intensities with the crystallographic planes from which the X-rays are coherently scattered.

The art of X-ray crystal structure determination by single crystal technique is well known and has been comprehensively reported (cf. Bragg, Sir L., The Crystalline State 1949; James, The Optical Principles of the Diffraction of X-Rays, 1950; Lipson, H. and Cochran, W., The Determination of Crystal Structures, 1953; (all) G. Bell & Sons Ltd., London). The art generally employed is as follows:

(1) The lattice dimensions of the unit cell are determined.

(2) The space group or all possible space groups are determined.

(3) The reflections are identified and indexed in terms of Miller indices.

(4) The integrated intensities of the indexed reflections are measured.

(5) Corrections appropriate to the manner in which the reflections are scanned are applied (e.g., Lorentz and polarization corrections) to the measured intensities. Other corrections, such as absorption corrections and extinction corrections, are applied if necessary. These corrections are made to reduce the measured intensities to quantities which are proportional to the squares of the structure factors.

(6) The structure is determined by an analysis of the structure factors. Generally, the experimental procedures 1 through 5 lead only to the magnitudes of the structure factors, but the phases of the structure factors are not known experimentally. The analytic techniques to interpret the data are perforce statistical and iterative and do not necessarily lead to the correct interpretation of the crystal structure. The efficiency with which the known techniques can be successfully applied is very much conditioned by the accuracy of the experimentally determined structure factors. The rate of convergence for iterative processes in refining structures is improved when accurate and copious data are employed, the accuracy of atomic positions and thermal parameters is also much more reliable when complete and accurate data are available.

The most common procedures to accumulate the data necessary in structure analysis in the prior art are photographic methods utilizing Weissenberg (cf. X-Ray Crystallography, Buerger, M. J., John Wiley & Sons, Inc., N.Y., 1942) or precession (cf. The Photography of the Reciprocal Lattice, Buerger, M. J., A.S.X.R.E.D. Monograph No. 1, August 1944) techniques. The quality of intensities as interpreted from film is much poorer than the quality which can be achieved using counter methods. Moreover, counter detectors as employed in this invention are more sensitive and enable the detection of minimal reflections which are not readily detectable by the photographic procedures.

Counter detecting instruments have been developed which can scan a zone of reflections and record the angular position of the counter and the angular position of the crystal when reflections are sensed. These angular positions are then employed to determine by extensive correlation the identity of the reflections.

In one such instrument the counter detector moves 2° as the crystal rotates 360°. When a reflection is sensed, the region in the proximity of the reflection site is explored at a much slower angular speed which requires (a) a two-speed driving mechanism and (b) a sensing device for detecting the reflection and slowing the rotation of the crystal.

In this particular device, the crystal is driven at a fairly high speed. A sensing device responsive to a reflection which is detected by the counter disengages a high-speed clutch and "back-sets" the crystal a few degrees. The reflection is scanned at slow speed over the angular range of the back-set after which the high-speed clutch is reengaged and the crystal rotated again at a high angular speed.

This mode of data collection is not ideal because the sequence of reflections sensed is not rational in terms of the crystallographic indices. Redundant data are acquired by the nature of the scanning mechanism and the efficiency of the sensing device depends upon the angular velocity of the counter in such a manner as to limit the high speed of the traverse in between sensed reflections.

The principal object of our invention is to provide a device which systematically and rapidly explores a crystal for reflections, determines the intensity of the reflections and concomitantly identifies the reflections with the crystallographic planes from which they arise, thereby enabling the structure of the crystal to be determined with a minimum of effort and time.

A further object of our invention is to provide a device which is more sensitive to reflections from the crystal and which obviates the necessity of redundant explorations.

A still further object of our invention is to provide a device for determining the structure of a crystal which avoids the necessity for extensive independent computing facilities for the crystal and detector setting angles and indexing of reflections.

Another object of our invention is to provide a device for determining the structure of a crystal in which the initiation of the scanning of a crystal reflection is independent of the intensity of the reflection at any reflection site.

Still another object of our invention is to provide a device for determining the structure of a crystal employing a mechanical linkage between the crystal and the detector to improve the accuracy of the resulting structure determination.

Yet another object of our invention is the provision of a device having a wider range of angular orientation than similar devices heretofore known in this art.

And still another object of our invention is to provide a device of the character described having at least one degree of freedom of movement more than similar devices known in this art.

These and further objects of our invention will appear as the specification progresses.

Before describing the instrument in detail, the principles of determining the structure of a single crystal will be reviewed.

The desired data for the structure determination of a crystal consists of the integrated intensities of diffraction spectra from a single crystal. All the diffraction spectra that can be reflected from a single crystal upon being irradiated by a parallel or near parallel beam of monochromatized or partially monochromatized X-rays can be represented by an assignment of each diffracted spectrum to a point in a three-dimensional lattice which is conventionally designated as the reciprocal lattice.

The reciprocal lattice is a three-dimensional network of points throughout the space surrounding the crystal. Each point in the reciprocal lattice is separated from the origin of the lattice by a distance inversely proportional to the interplanar spacing of the planes that it represents, and its directions from the origin is exactly the same as the direction of the normal to the planes.

If the unit cell dimensions of the crystal are represented by the vectors $a$, $b$, and $c$, the reciprocal lattice can be constructed and oriented relative to the crystal by constructing a three-dimensional grid with the repeat dimensions $a^*$, $b^*$, and $c^*$, where $$a^* = \frac{b \times c}{[abc]}, \qquad b^* = \frac{c \times a}{[abc]}, \qquad c^* = \frac{a \times b}{[abc]} \qquad (1)$$

A given point in the grid, say, $$r_{(hkl)} = ha^* + kb^* + lc^* \qquad (2)$$

represents the reciprocal lattice site associated with the coherent diffraction from the set of crystallographic planes of Miller indices $(hkl)$. Thus, if the crystal is oriented relative to the incident X-rays to satisfy the Laue conditions for the development of a diffraction spectrum from the set of planes $(hkl)$, the orientation of the crystal relative to the X-rays can be completely specified by the position vector $r_{(hkl)} = ha^* + kb^* + lc^*$. When the crystal orientation relative to the X-ray beam is specified by means of the orientation of its reciprocal lattice, the geometric arrangement necessary for the Laue condition of diffraction to be satisfied can be easily visualized using the Ewald construction. In the Ewald construction the direction of the X-ray beam is designated by the unit vector $S_0$. The sphere $$\left(r - \frac{S_0}{\lambda}\right)^2 = \frac{1}{\lambda^2} \qquad (3)$$

is constructed. This sphere has its center on the line collinear with the X-ray beam, the radius $1/\lambda$ and intersects the reciprocal lattice at the origin. The special property of this sphere is that the Laue conditions of reflection are satisfied whenever a reciprocal lattice point such as $r_{(hkl)}$ intersects the sphere. For this reason this sphere is conventionally designated as "the sphere of reflection."

To orient the crystal in order to develop a reflection (synonomously used for diffraction spectrum) from the $(hkl)$ planes it is merely necessary to bring the reciprocal lattice point $r_{(hkl)}$ so that it lies on the sphere of reflection. If the reflection is to be recorded with a counter detector, the detector must be pointing at the crystal in the direction $r_{(hkl)} + S_0/\lambda$.

Since the reciprocal lattice may contain thousands of reflection sites, the determination of the structure of a crystal involves the sorting of reflections, the conversion of angular measurements to reciprocal lattice measurements and the performance of a large number of routine calculations in addition to the determination of the intensities of the reflections.

Our invention relates to a device designed to efficiently collect the data described above. In this instrument, or an automatic diffractometer as it will hereinafter be called, a model of the reciprocal lattice is employed. This mechanical reciprocal lattice is linked to a counter detector in such manner as to successively execute the process of bringing reciprocal lattice points into the sphere of reflection while simultaneously providing that the detector be in its correct position to sense the diffraction effect when it takes place.

With our invention accurate and complete reflection data can be rapidly accumulated and concomitantly identified. The instrument can be operated manually, semi-automatically, or fully automatically. Consequently, it can be used to scan an individual reflection, a series of reflections corresponding to a line of reciprocal lattice points, or a complete zone or layer of reflections. For a line or layer of reflections, no manual attention is necessary after the instrument has been started. By automatically scanning successive layers in the reciprocal lattice it is possible to accumulate practically all the reflection data corresponding to the reciprocal lattice points of one octant of the total sphere of radius $2/\lambda$ without changing the alignment of the crystal. With minor angular adjustment, namely, 90° rotations of the crystal support, three more successive octants can be scanned so that all the independent reflection data required for a complete set of data for virtually any crystal can be accumulated.

The nature of the automatic scan is such that the scanning and recording of redundant reflection data are avoided. This significantly reduces the time necessary for the accumulation of data. The recorded data are automatically indexed.

With this instrument the scanning may be executed continuously or discontinuously. In the former case a continuous record is made of all X-ray scattering which takes place along reciprocal lattice lines. In the latter case, the discontinuous scan, the instrument avoids the recording and scanning of scattering effects along reciprocal lattice lines in the regions between reciprocal lattice points (reflection sites) where there are no significant coherent diffraction effects. Instead, the instrument provides that the detector and crystal motions rapidly transit from reflection site to reflection site and only spend time scanning and recording at reflection sites. This feature of the instrument provides a further saving of time.

By automatically indexing and exploring the reciprocal lattice of the crystal, the instrument simultaneously acts as an analogue computer and automatically performs routine computations, sorting of reflections and obviates the conversion of angular measures to reciprocal lattice measures, freeing the researcher from the need to perform these operations which were necessary in the prior art.

The assembly of the instrument employs a collimated, spectrally controlled beam of monochromatic X-rays so that scattered and unwanted radiation are eliminated in the diffraction records. The instrument employs a scintillation counter with pulse height discrimination providing the detection of only the homogeneous energy in the recorded spectra. These features provide for the reduction or elimination of overlap of radiations of different wavelength harmonics, a common contamination causing inaccuracies of diffraction recording in prior arts where Geiger counters or film detection methods are normally employed. By controlling the spectral content of the incident beam spurious scattering effects are reduced and the angular dispersion of reflection is limited assuring that each record of diffraction is completely detected, avoiding the errors typified by the elongation of diffraction spots on Weissenberg film records (cf. Buerger, M. J., X-Ray Crystallography, John Wiley & Sons, Inc., N.Y., 1942). These features provide for the improvement of the quality and homogeneity of the observed diffraction effects, thereby improving the accuracy of the data. Also, since in each case the total diffraction effect is measured, the results do not depend upon subjective interpretation of intensities required in prior film art or angular inaccuracies in the initiation and completion of scan of individual reflections in prior counter detection arts.

The invention will be described in connection with the accompanying drawing in which:

FIGS. 3a and 3b are perspective views of the crystal support goniometer;

FIGS. 5, 6 and 7 are plan views of the linkage assembly;

FIGS. 12, 13, 14, 15, and 16 are diagrammatic views showing the linkage in various positions as it traverses the crystal.

Figure 1:
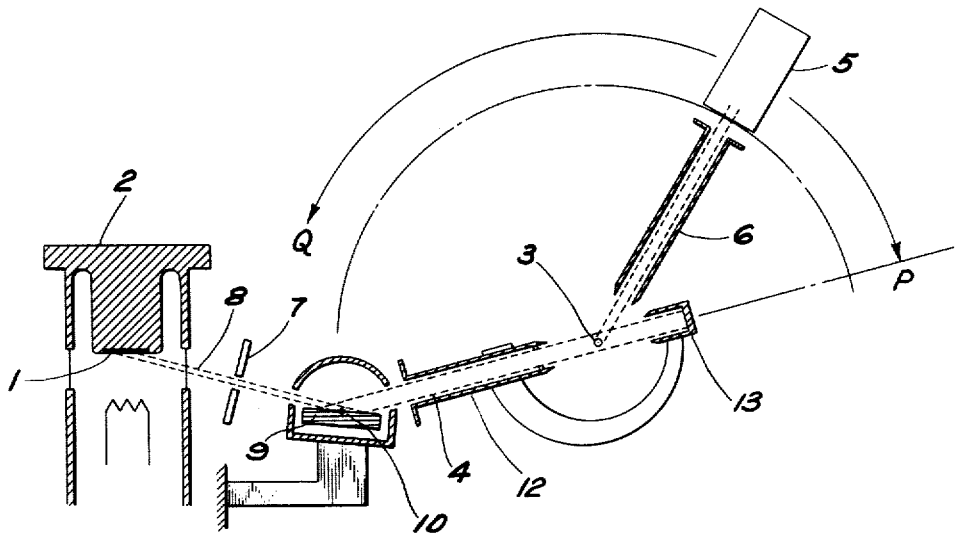
FIG. 1 is a schematic diagram showing the geometry of the incident beam of the diffractometer according to the invention.

Referring now more particularly to FIG. 1 of the drawing, X-rays emanating at the target focus 1 of an X-ray tube 2 are modified so as to bathe the study crystal 3 in a nearly parallel bundle of monochromatic X-rays 4 and to prevent as much as possible scattered X-rays from reaching the detector 5 by any path other than through the detector collimator 6. A primary divergence slit 7 defines a beam cross-section for the unmodified primary beam 8 which impinges upon a crystal monochromator 9. By rotating crystal monochromator 9 about an axis 10 the monochromator is set to the Bragg angle of reflection for the characteristic line wavelengths of the X-ray tube. X-rays diffracted by the monochromator and limited by the collimator 12 comprise the modified incident beam 4, which bathes the study crystal 3. The crystal monochromator 9 serves as a band pass filter and beam parallelizer since it rejects the spectral range of the X-rays diverging from the target focus which cannot meet the Bragg condition for diffraction and only permits a small, nearly parallel bundle of rays within and accepted by the crystal monochromator 9 to be diffracted. The parallel bundle of rays within and accepted by the monochromatic crystal 9 is broadened, using Fankuchen's principle (Frankuchen, I, Nature, London, 139, 193 (1937)) to increase the homogeneity of the spectral cross-section as viewed at the study crystal 3, and the collimator 12 further truncates the spectral distribution by limiting the angular aperture accepted in the modified beam, 4. The collimator 6 and the beam stop 13, are devices to prevent scattered radiation from entering the detector. The angular aperture of the collimator 6 corresponds in width with the widest angular dispersion necessary to collect essentially characteristic diffracted radiation from the crystal 3.

Figure 2:
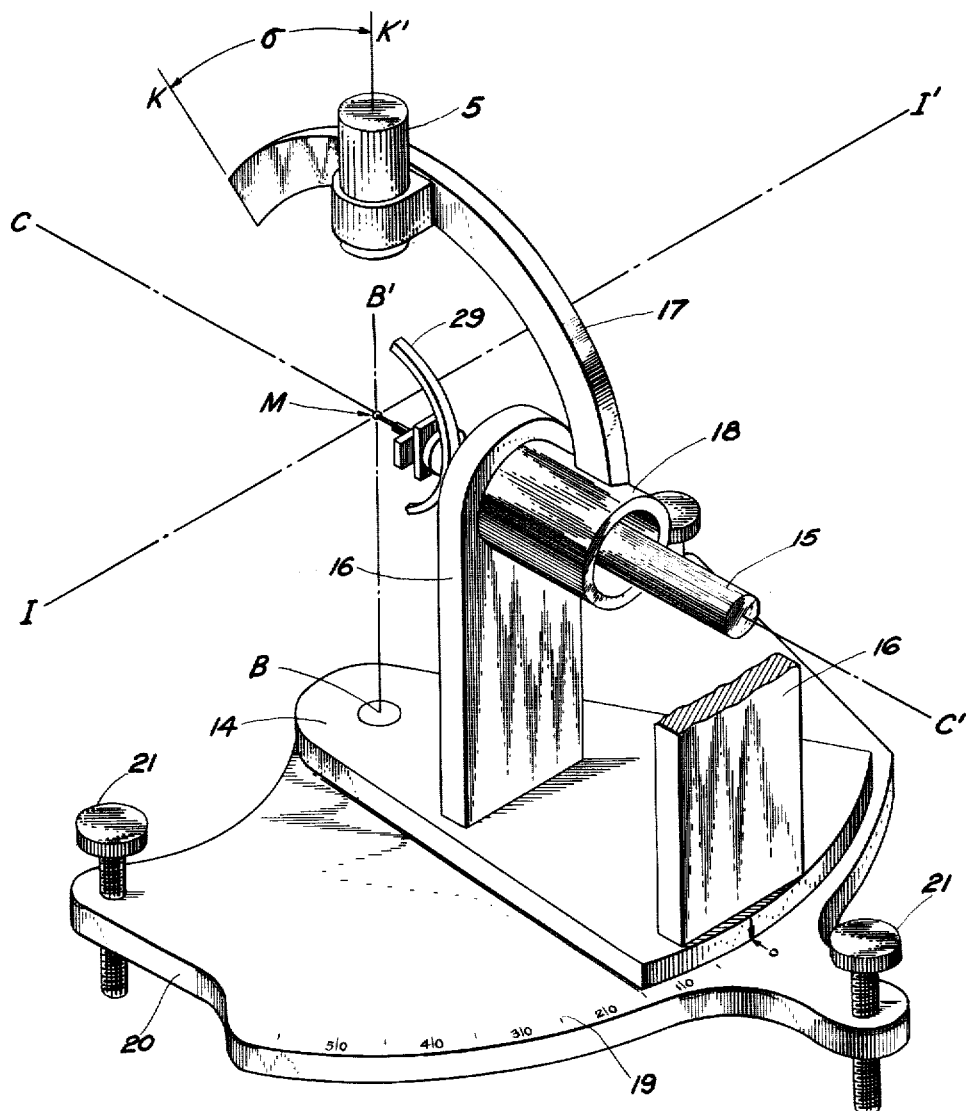
FIG. 2 is a perspective view of the diffractometer and crystal support assembly.

The diffractometer assembly consists of a structure supported on a turntable 14 (see FIG. 2), which can be rotated about a vertical axis BB' intersecting the modified incident X-ray beam II'. The structure houses a crystal support spindle 15, which can rotate in the two bearings 16 (one of which is shown partially cut away) on its axis CC' while supporting crystal 3 of FIG. 1 shown at position M in FIG. 2. The counter detector arc 17 supported on sleeve 18, can also be rotated independently about CC'. When the turntable is rotated through an angle ν measured on scale 19, the axis CC' rotates in a horizontal plane. The normal position of the assembly is as shown in FIG. 2. For this case $\nu=0$, and the detector 5 moves in the vertical plane determined by the directions BB' and II'. The normal position is appropriate for 0-layer or zone recording. To permit inclination techniques (cf. Buerger, M. J., "X-Ray Crystallography," John Wiley & Sons., Inc., N.Y., 1942) for the recording of upper levels, the arc 17 and turntable 14 are provided. When the counter detector is moved through an angle σ on the sector KK' and the turntable rotated through the same angle ν, the condition for equi-inclination recording is realized. The base of the diffractometer 20 is supported on three screws 21 to permit alignment of the assembly.

The crystal support goniometer is shown in FIGS. 3a, 3b. The function of the crystal support goniometer is to provide a means of accurately aligning the crystal to be studied. The required alignment is (a) to bring the crystal to the point M in FIG. 2, so that it is positioned on the axes BB', CC', and II' (in FIG. 2), and (b) to align a given axis in the crystal (normally a crystallographic axis) with CC'.

The support goniometer provides 5 degrees of freedom to accomplish the required alignment. Three independent translational motions are provided by two orthogonal movable platforms 22 and 23, and a screw 24 which elevates the crystal at H above the platform 23 when nut 25 is turned. Alignment (a) is accomplished by the three translation elements of the goniometer support.

The translation elements are supported on calibrated turntable 26 which turns on the circular platform 27 rigidly connected with the carriage 28. The carriage can move on arc 29 which is rigidly supported through collar 30 to the crystal support spindle 15 of FIG. 2. Alignment of a crystal axis to coincide with CC', FIG. 3b, is accomplished by making the appropriate arc and turntable rotations, i.e., setting the angles $\psi$ and $\phi$ as shown in FIG. 3b.

Suppose that a crystal is mounted at H in FIG. 3a and it is required to orient the crystal which is out of alignment. The procedure is as follows: The desired axis when projected in the plane CC'—II' subtends an angle $\delta_H$ from CC'. Also, the angle between the desired axis and the plane CC'—II' is $\delta_V$. The appropriate turntable and arc settings required to align the crystal so that the desired axis coincides with CC' are:

$$\phi = \tan^{-1}\left\{\frac{\sin \delta_H}{\tan \delta_V}\right\} \qquad (4)$$

$$\psi = \tan^{-1}\left\{\tan \delta_V \frac{\sec \phi}{\cos \delta_H}\right\}$$

$$= \tan^{-1}\left\{\tan \delta_V \frac{\sec \tan^{-1}\left\{\frac{\sin \delta_H}{\tan \delta_V}\right\}}{\cos \delta_H}\right\} \qquad (5)$$

If the goniometer support is rotated on the axis CC' so that the plane of arc 29 is normal to II', the symbols $\delta_H$ and $\delta_V$ refer to horizontal (plane CC' I'I) and vertical (QQ') angular displacement, respectively. The range of the crystal support goniometer is restricted by the 170° angle subtended by arc 29 and the dimensions of the carriage 28 (FIG. 3). The restriction is imposed so that the incident beam should not intersect the support goniometer. The usable range is about 140°, i.e., if a right circular cone is generated with apex of 140° at M and axis CC' any crystal axis within the cone can be aligned to coincide with the axis CC'. Thus, for example, if an orthorhombic crystal initially has none of its principal (crystallographic) axes within 20° of CC' when the goniometer is in the position shown in FIG. 3a, each of the principal axes can be oriented to CC' without remounting the crystal. Thus in most cases where orthogonal or nearly orthogonal zones are to be scanned, the necessity of remounting the crystal required in the normally used crystal goniometer supports is avoided.

Figure 4A:
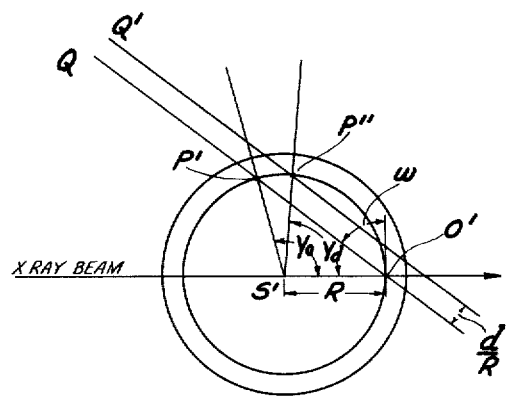
FIGS. 4a and 4b are plan and elevational views of the n-level plane of the reciprocal lattice.
Figure 4B:
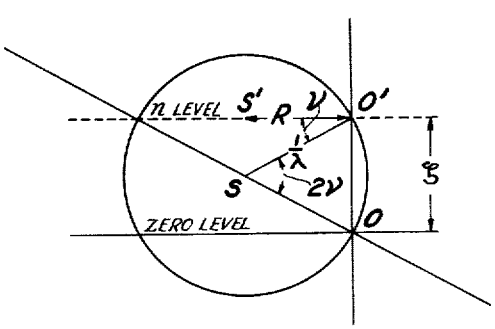

To facilitate a discussion of the linkage which constrains crystal and counter motions, a brief description of the well-known geometry of the equi-inclination Weissenberg technique is shown in FIG. 4. FIG. 4a shows the projection of the n-level plane of the reciprocal lattice Also shown are the incident ray $\overline{S'O'}$, the projection in the n-level plane of the diffracted ray $\overline{S'P'}$, the crystal rotation angle ω, the circle of reflection of radius R which is the intercept of the sphere of reflection with the n-level plane and Y the counter angle i.e., the angle between the projected incident and diffracted rays ($Y=Y_0$ for the point P′ and $Y=Y_d$ for the point P″). The elevation view, FIG. 4b, shows the equi-inclination angle $\nu$, the crystal axis of rotation $\overline{O'O}$ and $\zeta$, the distance between the zero and n-levels. For monochromatic radiation of wavelength $\lambda$, $R=(1/\lambda)\cos\nu$ and $\zeta=2R\tan\nu$, $\overline{O'Q}$ is a line in the n-level plane of the reciprocal lattice (i.e., n-levels above the zone which is normal to the crystal axis of rotation).

If there are reciprocal lattice points on the line $\overline{O'Q}$, these will come into reflecting positions as the crystal is turned through the angle $\omega$. If the crystal is rotated through $\omega$, the detector (mounted at angle $2\nu$ from the direction of the X-ray beam in a vertical plane, see FIG. 2) is rotated through the angle $Y_0$, the detector will be in position to receive the diffracted spectra corresponding to the reciprocal lattice points on the line $\overline{O'Q}$. Consider the line passing through Q′ and P″ which is displaced a distance $d/R$ parallel to QO′, the counter angle required to detect a reflection due to a reciprocal lattice point at P″ is given by $Y_d$. The relation between $Y_d$ and $\omega$ is (see Buerger, M. J., X-Ray Crystallography, at page 270):

$$Y_d = \omega + \cos^{-1}\left(\cos\omega + \frac{d}{\cos\nu}\right) \quad (6)$$

The scanning device described here is an adjustable mechanical linkage which provides a continuous analogue solution for $\omega$ in Equation 6. Equation 6 is appropriate for recording along parallel reciprocal lattice lines in the equi-inclination scheme for accumulating data. To employ this scheme the linkage contains adjustable controls to fix the parameters $d$ and $\cos\nu$. By appropriately setting the controls for $d/\cos\nu$ in the linkage, any line parallel to $\overline{O'Q}$ in reciprocal space can be scanned automatically by a motor driving the counter detector through the angle Y.

An automatic stepping assembly, for use in a diffractometer employing the equi-inclination scheme is shown in FIGS. 5 and 6. Its use, however, need not be restricted to equi-inclination technology. Since the linkage is a replica reciprocal lattice line, the diffractometer can be automatized for any generalized inclination technique including the normal beam method see, for example, FIG. 7. When using the generalized inclination scheme (including the normal beam scheme) the appropriate equations are:

$$Y = \omega + \cos^{-1}\left(\frac{\cos\omega}{\cos\nu} + \frac{d}{\cos\nu}\right) \quad (7a)$$

$$Y = \omega - \cos^{-1}\left(\frac{\cos\omega}{\cos\nu} + \frac{d}{\cos\nu}\right) \quad (7b)$$

An additional control is maintained in the linkage to alter the function from that of solving Equation 6 to that of solving Equation 7a. In routine analysis the former scheme is preferred, but in some analyses the latter scheme may have some advantages. Use of the diffractometer employing the normal beam method will be discussed separately, infra. (The analogue solution of Equation 7b can be accomplished by omitting the idler gear 33 of FIGS. 5, 6 or 7 and enlarging gears 32 and 39 so that they couple. The rotation of 39 is then transferred to 32, but in this case 32 rotates in the opposite direction of 39.)

Once the crystal has been aligned so that the crystal support spindle coincides with a crystallographic axis and a central reciprocal lattice line is parallel to the direction $\overline{O'Q}$, successive points on the line $\overline{O'Q}$ can be explored. By successively changing the control of $d/\cos\nu$, successive lines parallel to $\overline{O'Q}$ within the zone or level can be explored. By inclining the plane of the linkage at an angle $\nu$ to the direction of the incident X-rays (by rotating the diffractometer assembly on the turntable provided) and extending the counter arm at an angle $\nu$ from the counter arm support, successive levels can be explored. As shown in FIG. 1, the counter motion is restricted by the tube tower and monochromator assembly so that the practical total sphere accessible is somewhat smaller than that of radius $2/\lambda$. Actually the accessible sphere is that of radius $$\frac{2}{\lambda}\sin\left(\frac{Y_{max.}}{2}\right)$$

With one crystal alignment one quadrant of any level can be fully explored since the minimal Y angle achievable along any line parallel to the initial central line at distance $d$ is given by $$Y_{min.} = 2\sin^{-1}\frac{d}{2} \quad (8)$$

Thus, for example, if an orthorhombic crystal rotating about its c-axis had been initially aligned so that $\overline{O'Q}$ is collinear with the direction $b^*$ in the reciprocal lattice, and the jth level were being explored, all reflections with positive indices $hkj$ (within the limiting total sphere) would be accessible without changing the orientation of the crystal relative to the linkage ($\nu$ for this level would be conditioned by $$\nu = \sin^{-1}\left(\frac{j|c^*|}{2}\right))$$

Without altering the orientation of the crystal relative to the crystal support spindle and by successively changing the value of $\nu$ to correspond with successive values of $j$ from $j=0$ to the integer $$j \leq \frac{2}{|c^*|}$$

all reflections of positive index $(hkl)$ can be explored.

The linkage is shown in FIG. 5. The crystal goniometer support (not shown) is mounted on the crystal support spindle 31. Spindle 31 is rigidly affixed to gear 32 which rotates about axis CC′ (normal to plane of sketch) when driven by idler gear 33. The counter detector drive wheel 34, on which is fixed the counter detector support arm 35 and adjustable pin 36, rotates the counter 5 clockwise, decreasing the angle Y. When the counter detector drive wheel 34 is rotated, pin 36 constrains the rotation of slotted driving bar 37 about the axis 38, controlling the crystal angular change $\omega$. The rotation of bar 37 about axis 38 is transferred to gear 39. Screw 40 normal to slotted bar 37 is rigidly attached to gear 39. By turning knob 41, the base of bar 37 can be translated along screw 40 providing the adjustment to change $d/\cos\nu$. An adjustment provides for positioning pin 36 in positions intermediate to the points P, N. This adjustment is not used in the equi-inclination scheme; it is required for n-level normal beam recording or generalized inclination techniques. When aligned, the reciprocal lattice line $\overline{O'Q}$ of FIG. 4 is parallel to the slotted bar 37.

FIG. 6 shows the linkage adjusted to scan along the non-central line P″Q′. The base of bar 37 has been translated along screw 40 by an amount proportional to $d/\cos\nu$.

Figure 7:
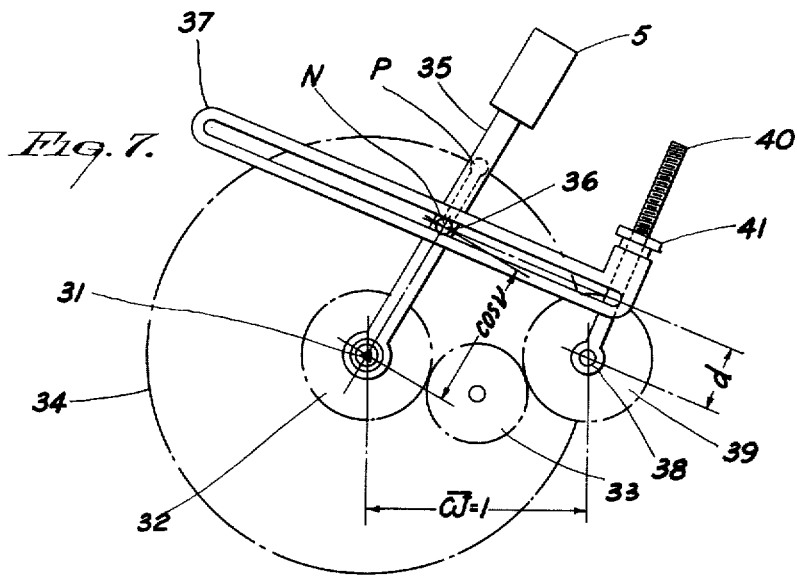

FIG. 7 shows the linkage adjusted to scan along a non-central line using the n-level normal beam technique.

The automatic features of the instrument can more readily be understood by considering first the automatic discontinuous scan of a zone of reflections. For this case, $\cos\nu = 1$, and the separation of parallel rows in the zone is given by $d$.

The structure in the linkage consisting of the slotted driving bar 37, and normal screw 40, which terminates at the point 38 (FIG. 6) may be envisaged as a large scale replica of two perpendicular segments of the reciprocal lattice which has its origin at the point 38. The circumference of the drive wheel 34 is then the circle of reflection, and the Laue conditions for reflection are satisfied for reciprocal lattice points along the bar 37 whenever in the course of the counter rotation the pin 36 coincides with a reciprocal lattice point. The dimensions of the "replica" of the reciprocal lattice are determined by making the reciprocal distance $1/\lambda$ proportional to $\overline{CJ}$, the distance between 31 and 38 of FIGS. 5 and 6. The dimensions of the replica reciprocal lattice are obtained by multiplying the true reciprocal lattice dimensions given in Equation 1 by the factor $(\overline{CJ})\ \lambda$. For convenience we have made $\overline{CJ}=10$ cm. Since J is the origin of the reciprocal lattice, points of the reciprocal lattice will be equally spaced along the bar 37, which, as shown in FIG. 5, is a central line (cf. Buerger, M.J., "X-Ray Crystallography," John Wiley & Sons, Inc., New York, 1942) of the reciprocal lattice. Also reciprocal lattice lines parallel to the bar 37 will be equally spaced and the spacing interval (reciprocal lattice repeat) can be measured along the screw 40. For illustration, let us assume that our crystal is orthorhombic and the O$kl$ zone is to be scanned. The crystal has been aligned so that the $b^*$ axis is parallel to slotted bar 37 and the $c^*$ axis is parallel to the screw 40. In FIG. 5, then, the reciprocal lattice sites for the reflections (O$k$O) are spaced $10\lambda|b^*|k$ cms. along the bar 37. To code the instrument for automatic operation a bar 42 in FIGS. 8 and 9 notched at intervals $10\lambda|b^*|$ is rigidly attached parallel to the bar 37, FIGS. 5, 6 and 7. Another bar, 43, FIGS. 8 and 9, notched at equal intervals according to the reciprocal lattice repeat normal to that used for 42, is rigidly affixed parallel to the screw 40. For the case cited the interval of the notches along 43 is $10\lambda|c^*|$. The automatic stepping mechanism comprises five microswitches 44, 45, 46, 47 and 48, the counter motor drive 49, the crystal motor drive 50, and a motor drive 51 which turns the screw 40. Whenever the activating device of microswitch 47 is seated in a notch, the crystal is oriented so that slotted bar 37 coincides with a reciprocal lattice line (such as Q'P" of FIG. 4). If in addition, the activating device of microswitch 44 is seated in one of the notches of 42, the pin 36 coincides with the position of a reciprocal lattice point. The pin 36 is rigidly attached to drive wheel 34, to which is attached the counter arm. Thus, for the O$kl$ zone illustration if 44 is in the $k$th notch and 47 is in the $l$th notch the reciprocal lattice point (O$kl$) coincides with pin 36 and the crystal is oriented to reflect the (O$kl$) reflection, while at the same time the counter is in a position to sense the reflection. If the activating devices of 44 or 47, or both, are not seated in notches, the counter and crystal are not oriented to reflect coherent diffraction spectra. The automatic operation of this instrument is effected by sequentially altering the linkage (changing the position of nut 52 which is rigidly attached to the base of slotted bar 37 on screw 40) and by driving the crystal through its linkage with the counter motor 49 to bring the activating devices of microswitches 44 and 47 to all possible notched positions within the range of the instrument, i.e., to explore all reciprocal lattice sites included within ¼ of the zone for which the counter angle Y is less than $Y_{max}$. The automatic accumulation of data proceeds in two phases. In the first phase the instrument "explores" the reciprocal lattice by successively proceeding to bring counter and crystal to sequential reciprocal lattice sites. In the second phase the integrated intensity or line profile is scanned at a reciprocal lattice site. At the termination of the second phase, the geometric condition which was manifest at the initiation of the second phase is restored and the first phase operation is resumed.

The initial conditions for the automatic scan are as follows:

(1) The detector is brought to its maximum angular position short of contact with microswitch 46. (46 is activated when the highest angle $Y_{max}$ is reached.)

(2) Knob 41 is turned so that bar 37, supported at 52, is at its minimum position 70; screw 40 is in position as shown in FIG. 5.

(3) The automatic operation switch which energizes motor 49 is turned on.

Motor 49 initially rotates at a relatively high speed in a clockwise direction turning (through gears 71, 72, clutch 73, and worm 74) the counter drive wheel 34, bringing the counter to lower angles of Y. Pin 36 moves in slotted bar 37 while microswitch 44, rigidly connected to pin 36, rides along the notched bar 42. When the activating mechanism of 44 enters a notch, motor 49 is braked and halted. Auxiliary motor 50 and the intensity recording sequence (phase 2) are then activated. When motor 50 is energized clutch 78 is disengaged to free the crystal from its linkage to the counter and power is transmitted through gears 75, 33, 32 to crystal shaft 31. At the completion of the intensity recording, clutch 78 is reengaged and motor 49 is energized to resume its clockwise rotation. This sequence continues as the reciprocal lattice sites on the line of the slotted bar 37 are explored and scanned. In the illustration of a typical reciprocal lattice zone shown in FIGS. 10$a$ and 10$b$, the instrument explores (solid line) and scans (notches) from A to B. The first sequence terminates when microswitch 45, which is rigidly attached to pin 36 is activated by contact with the screw assembly (52, 40). When microswitch 45 is activated the counter has reached its minimum position $$Y = 2 \sin^{-1} \frac{d}{2}$$

Initially, e.g. in the scan from A to B, nut 52 is at position 70 corresponding to $Y=0°$.

Figure 8:
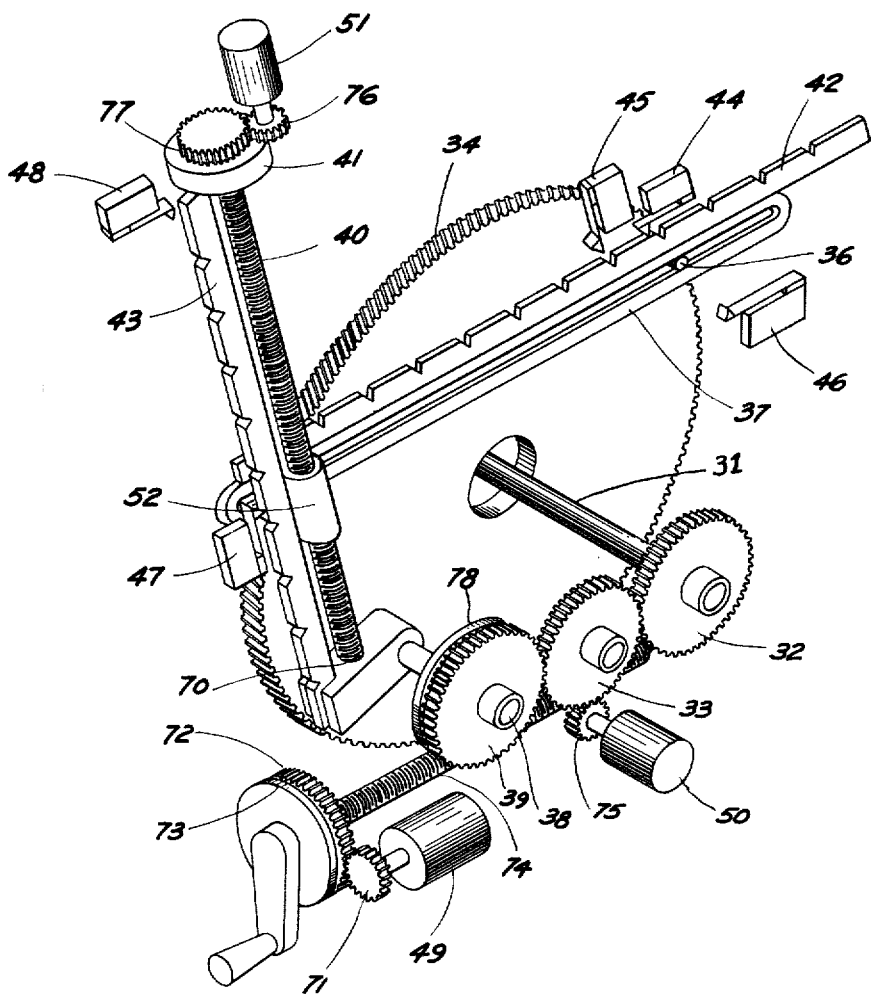
FIGS. 8 and 9 are perspective views of the linkage assembly shown in plan view in FIGS. 5, 6 and 7.

When 45 is activated a bank of relays is energized to effect a cancellation of the function of microswitch 44 and to energize motor 49 to rotate counter clockwise. The counter moves to higher angles without interruption along the path shown as a broken line, BA, in FIGS. 10$a$ and 10$b$. When the counter has ascended to $Y_{max}$ (point A, FIGS. 10$a$ and 10$b$), the high angle microswitch 46 is activated which then energizes motor 51 to rotate counterclockwise, raising slotted bar 37 on screw 40 through gears 76 and 77 (FIG. 8). The analogue of this motion in the reciprocal lattice is shown as the dotted line $\overline{AC}$ in FIGS. 10$a$ and 10$b$. The rotation of motor 51 is interrupted when microswitch 47 enters a notch on bar 43. The first sequence is now repeated (initiating a new cycle); the analogue motion of exploration and scan is shown on the solid line $\overline{CD}$. To provide automatic indexing, a marking pen is activated whenever microswitch 47 is activated. The sequence of motions proceeding in cycles continues until the full range shown by one quadrant of FIGS. 10$a$ and 10$b$ are traversed. The instrument recognizes the completion of the exploration and scan when microswitch 48 is activated. The initial positions of microswitches 46 and 48 are adjustable so that the region to be explored can be restricted, i.e., the radius shown in FIG. 10 can be reduced.

Provision is made for the exploration and scan of non-orthogonal levels by utilizing a protractor 79 (in FIG. 9) which is set to the appropriate reciprocal angle. Thus if the zone $h0l$ of a monoclinic or triclinic crystal were to be explored, the slotted bar 79, which can be rotated about the origin of notched bar 43, is set at an angle $(90-\beta^*)$ measured from bar 43 along arc RR'. Pin 53 in bar 42 (FIG. 9) rides in the slot of 79 so that when 79 is raised on screw 40, notched bar 42 is translated parallel to slotted bar 37 by an amount equal to the elevation of 79 on screw 40 (the distance $d$ or $d/\cos v$) multiplied by $\tan(90-\beta^*)$. Thus for the illustration cited, if bar 42 is incremented by notches spaced $10\lambda|a^*|$ cms., the incrementation along bar 43 is $10\lambda|c^*| \sin \beta^*$ cms. (The scale of the protractor is not shown in FIGS. 10$a$ and 10$b$.) The automatic operation for the non-orthogonal zone and the analogue scan is shown in FIG. 10$b$.

To automatically scan upper levels using the equi-inclination technique, the notched bars 42 and 43 are replaced with bars notched at incrementation intervals increased by a factor $1/\cos \nu$. Thus for upper levels of the zone in the first illustration the upper level bars 42 and 43 are notched respectively at increments $10\lambda|b^*| \cos \nu$ cms. and $10\lambda|c^*| \cos \nu$ cms. In the second illustration the increments would be $10\lambda|a^*|/\cos \nu$ and $$10\lambda|c^*|\left/\frac{\sin \beta^*}{\cos \nu}\right.$$

The position of the first notch for the upper level bars 42 and 43 would be the same as in the zone bars 42, 43 if the crystallographic axis of rotation coincided with the reciprocal axis. For other cases either the first notch on bar 42 or the first notch on bar 43, or both, would be displaced to conform to the non-Cartesion character of the replica reciprocal lattice. The diffractometer assembly, FIG. 2, is rotated about the axis BB' through the angle $\nu$, measured on scale 19, and similarly the counter is offset on arc 17 FIG. 2, an angular amount $\nu$.

Figure 9:
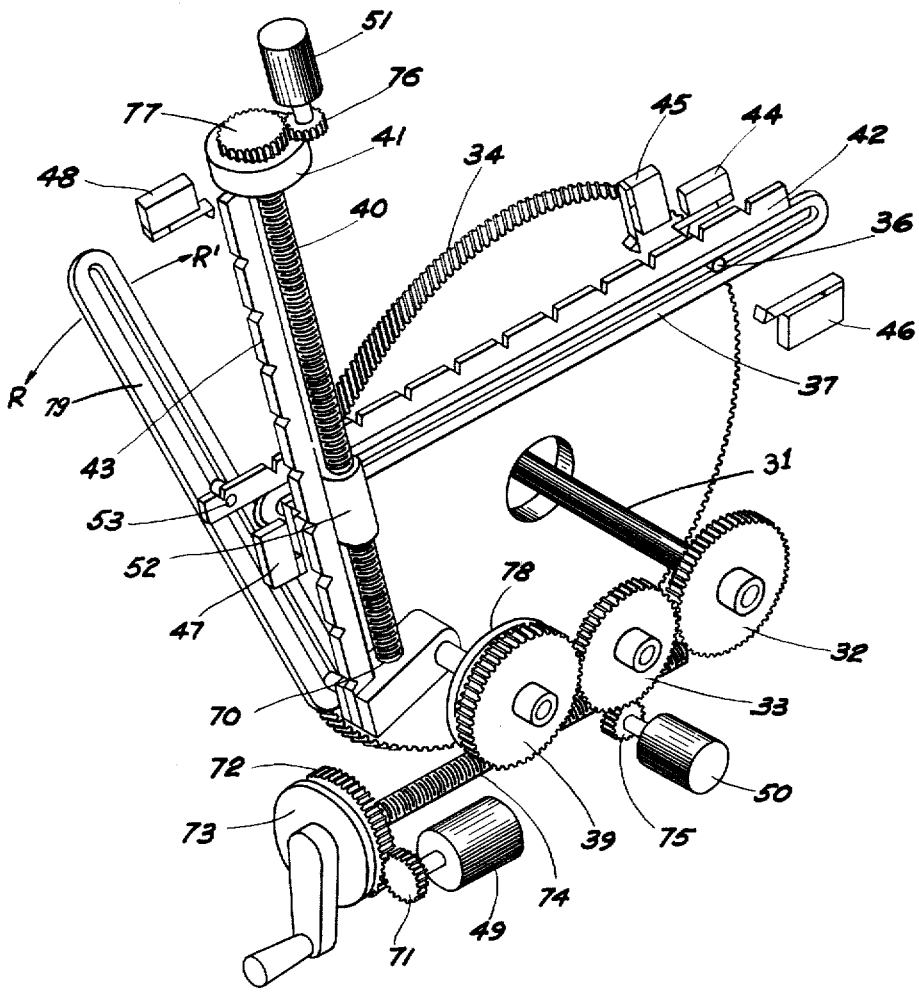
Figure 10A:
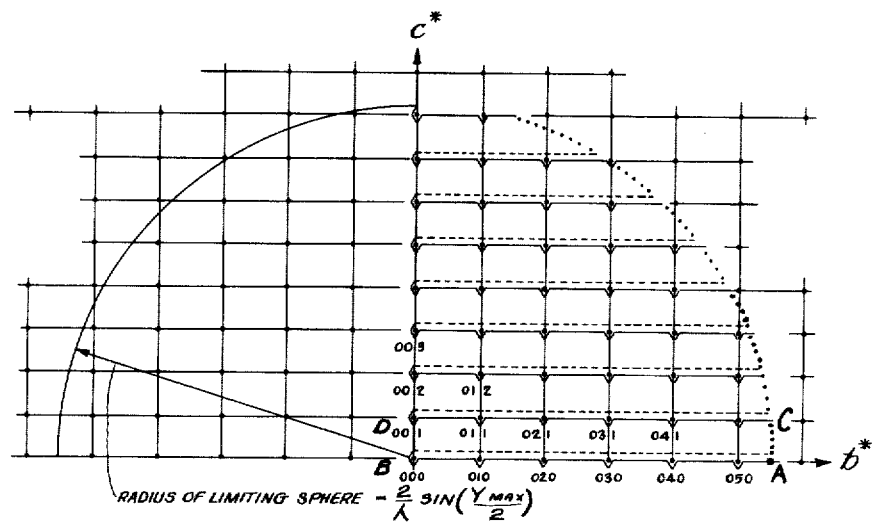
FIGS. 10a and 10b are diagrammatic views of a typical lattice zone.
Figure 10B:
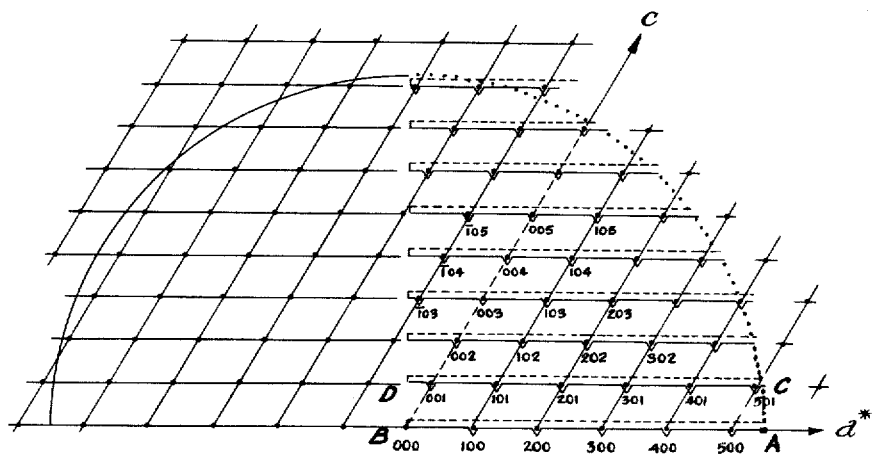

To automatically obtain a continuous scan along parallel reciprocal lattice lines, the function of microswitch 44 and notched bar 42, FIGS. 8, 9, are suspended and the recorder is permitted to record continuously. The continuous scan is used (1) to initially determine the reciprocal repeat along a central line so that notched bar 42 can be prepared, (2) to refine the crystal orientation relative to the linkage, and (3) in all structural studies where the diffraction effect decays slowly from the quantized reciprocal lattice site, e.g., thermal diffuse scattering.

Figure 11:
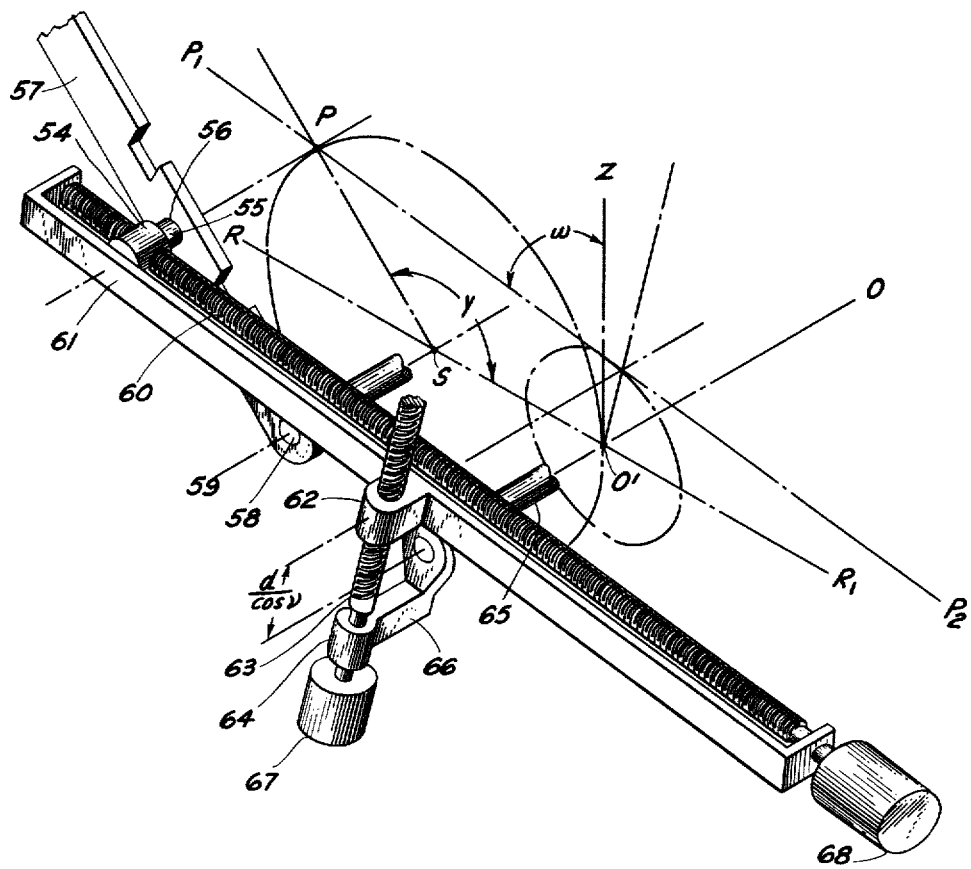
FIG. 11 is a perspective view of another form of linkage.

While the linkage described permits scanning of one quadrant, FIG. 11 shows a mechanical linkage which permits the counter of an X-ray single crystal diffractometer to make an uninterrupted scan of a selected straight line in reciprocal space within the range of the limiting sphere, i.e. an entire reciprocal line within the limiting sphere can be explored (scanned) without the need for intermediate changes in linkage or crystal adjustments. In this embodiment a nut 54 is welded to shaft 55 which is free to rotate in a bearing 56 drilled in detector arm 57. Detector arm 57 terminates in a sleeve which houses shaft 58 and rotates about axis 59. Nut 54 rides on worm 60 and can be linearly displaced along the length of carriage 61, which is rigidly connected to nut 62 in such a manner as to maintain carriage 61 always normal to worm 63 for any position of nut 62 on worm 63. Worm 63 is supported in bearing 64 which is rigidly connected to shaft 65 by means of yoke 66. The rotation of shaft 65 is transferred by means of gears (not shown) to shaft 58 which supports the crystal on axis 59. Motor 67, supported on yoke 66, when energized rotates worm 63 causing nut 62 to advance away from motor 67. The X-ray beam enters in the plane of $\overline{RR'}$ and axis 59 and intersects the crystal at S; the counter detector angle is shown by Y and the crystal angle by $\omega$. $\overline{O'O}$ is the axis of rotation of shaft 65, i.e., the axis of rotation of the reciprocal lattice. O'Z, normal to the plane of $\overline{RR'}$ and axis 59, is the reference line from which $\omega$ is measured. The geometry shown in perspective in FIG. 11 corresponds to the geometry shown in FIG. 4. The analogue of the displacement $d/\cos \nu$ of the reciprocal lattice line to be scanned is the distance between the center of shaft 65 and (center of) nut 62. Motor 67 is energized only to fix $d/\cos \nu$ i.e., to select a reciprocal lattice line. The analogue of the reciprocal lattice line to be scanned is the line segment along the entire worm 60.

Under the constraints of the linkage, nut 54 can be in one of two positions on the worm 60 when the detector arm 57 is at its maximum counter angle $Y_{max}$. These two positions correspond to the points of intersection of the reciprocal lattice line and the limiting sphere $$\left(\text{of radius } \frac{2}{\lambda} \sin \frac{Y_{max.}}{2}\right)$$

Figure 12:
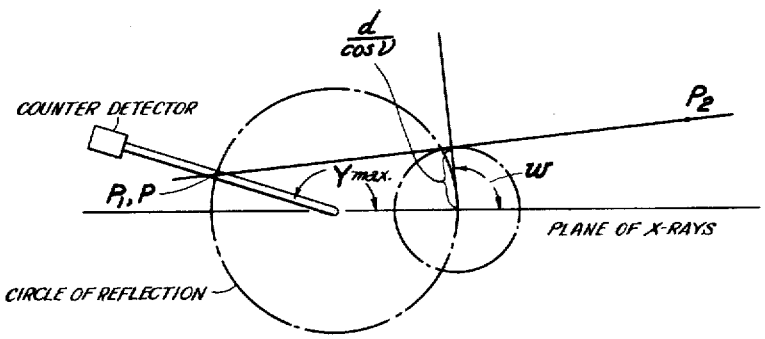
Figure 13:
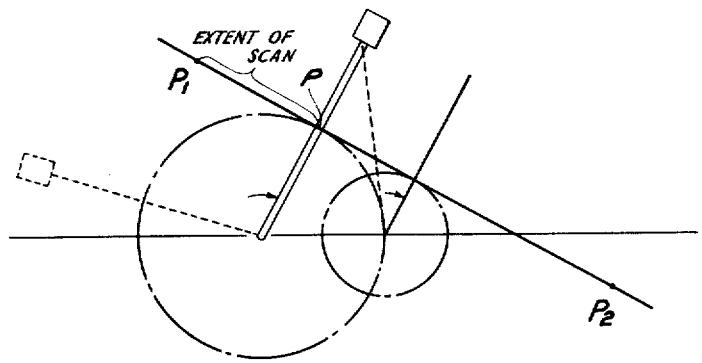
Figure 14:
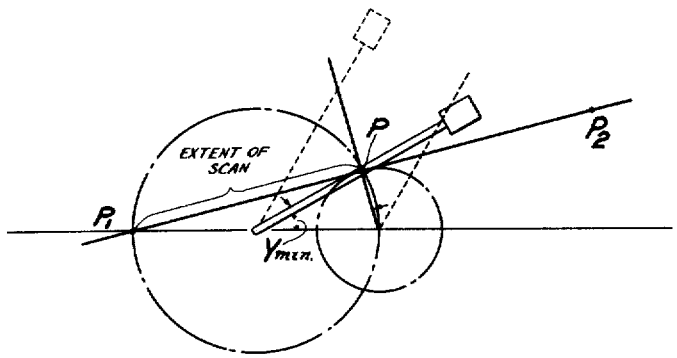
Figure 15:
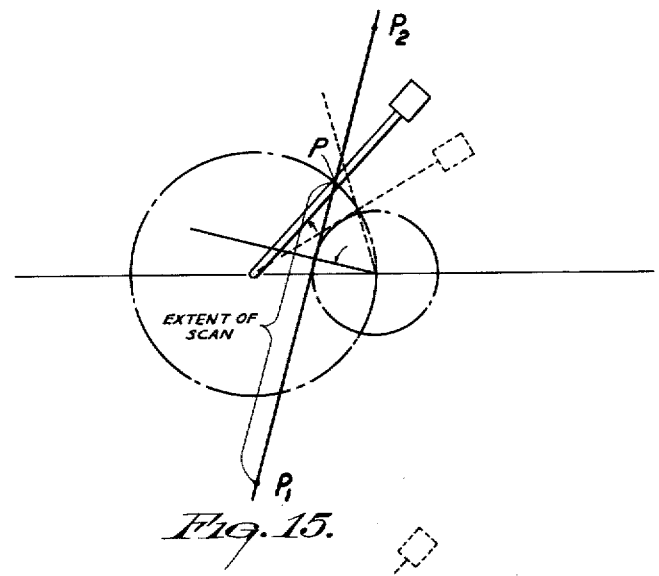
Figure 16:
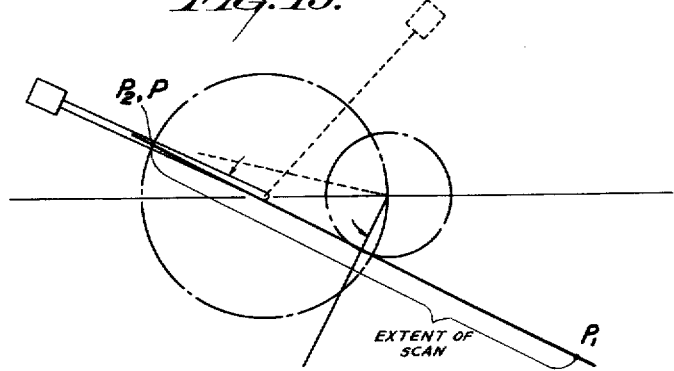

For convenience, let the position of nut 54 on worm 60 for $Y_{max}$ nearest to motor 68 be designated $P_1$ and the other possible position be designated $P_2$. If nut 54 is initially at $P_1$ and motor 68 is energized, nut 54 will advance to position $P_2$. In the course of the transit of nut 54 from $P_1$ to $P_2$, the counter and crystal motions will be constrained so that the counter setting angle Y and crystal setting angle $\omega$ conform with Equation 6 for all positive values of Y and all values of $\omega$, provides $d/\cos \nu$ is not zero, provided the center of nut 54 does not coincide with the center of shaft 65. When $d$ is zero, a singularity exists; nut 54 can only advance to the midpoint of $P_1P_2$, since further rotation of the detector arm without changing direction is prohibited by the interference of yoke 66. (This singularity is removed by independently causing carriage 61 to rotate 180° when nut 54 has advanced to the midpoint of $P_1P_2$. The singular 180° rotation can be effected by providing a microswitch to be activated when the counter detector arm comes in contact with yoke 66. The microswitch when activated causes a toggle spring to operate effecting the desired 180° angular deflection.) The constrained crystal and counter motions are shown schematically in FIGS. 12, 13, 14, 15 and 16. In FIG. 12, the linkage is shown in its initial position, the counter is at maximum angular deflection $Y = Y_{max}$. In FIG. 13, the counter and crystal have rotated clockwise, as shown by the arrows, and the line $P_1P$ has been scanned. In each succeeding figure the previous position is shown by a broken line, the advance of scanning point P is shown. In FIG. 14, the minimum counter angle $Y_{min}$ has been reached; the point P has reached the midpoint of $P_1P_2$. The counter continues to rotate clockwise, but the crystal now rotates counter-clockwise. The extent of the scan accomplished, as shown in FIG. 14, is the extent accessible in the linkage shown in FIGS. 5, 6, 7, 8 and 9. In FIG. 15, the scanning point P has moved beyond the midpoint of $P_1P_2$; the counter and crystal now rotate counter-clockwise. In FIG. 16, the final position at the completion of the scan is shown.

The motions depicted in FIGS. 12, 13, 14, 15 and 16 are reversible, i.e., FIG. 16 may have been taken as the intial position and the course of the scan could have been shown in the reverse sequence of figures by the increase of the segment $P_2P$.

For the sake of simplicity, details of the construction of the detector and recording devices have been omitted as they are well known in this art. Detectors suitable for the diffractometer include not only a scintillation counter but also proportional counters, flow counters, or Geiger counters. A pulse height discriminator is advantageously employed with either a scintillation or proportional counter to improve resolution and counting statistics. A suitable arrangement is described by W. Parrish, Philips Technical Review, 17, 1956.

This diffractometer is not limited to making crystal structure determinations by means of X-rays but can also be used with neutron sources or gamma ray sources.

Various modifications of our invention will occur to those skilled in this art without departing from the spirit and scope of our invention. Therefore, we do not wish to be limited to precisely the structures disclosed but desire the appended claims which define our invention to be construed as broadly as possible in view of the art.

What we claim is:

1. A diffractometer comprising a base, a support rotatable on said base, an arcuate member rotatably secured to said rotatable support, a radiation detector moveably mounted on said arcuate member and moveable over a large spherical surface, a specimen holder rotatably mounted on said rotatable support for rotation about a given axis and about an axis normal to said given axis, said specimen holder comprising a second arcuate member mounted for rotation about said given axis and along which said specimen can be moved within an angle of about 140°, a rotatable member supported by and moveable along said second arcuate member capable of 360° rotation whereby said specimen can be brought to substantially any angular orientation relative to an X-ray beam and all diffraction spectra which can be produced by a given wave-length of X-radiation can be detected up to large Bragg angles, and means to directly couple the detector and specimen movements to systematically record all said diffraction spectra along reciprocal lattice rows.

2. A diffractometer comprising a base, a support rotatable on said base, an arcuate member rotatably secured to said rotatable support, a radiation detector moveably mounted on said arcuate member and moveable over large spherical surface, a specimen holder rotatably mounted on said rotatable support for rotation about a given axis and about an axis normal to said given axis, said specimen holder comprising a second arcuate member mounted for rotation about said given axis and along which said specimen can be moved within an angle of about 140°, a rotatable member supported by and moveable along said second arcuate member capable of 360° rotation whereby said specimen can be brought to substantially any angular orientation relative to an X-ray beam and all diffraction spectra which can be produced by a given wave-length of X-radiation can be detected up to large Bragg angles, and a set of orthogonal interconnected members rotatable about an axis in a given direction coincident with the axis of rotation of the specimen coupling the detector and specimen movements to systematically record all said diffraction spectra along reciprocal latice rows.

3. A diffractometer as claimed in claim 2 in which one of said members rotates about the axis of the specimen and the other member rotates about an axis parallel to the axis of rotation of the specimen.

4. A diffractometer as claimed in claim 3 in which the member rotatable about an axis parallel to the axis of rotation of the specimen is coupled to and rotates the specimen.

5. A diffractometer as claimed in claim 4 in which pivot means are provided for constraining the movement of the member rotatable about an axis parallel to the axis of rotation of the specimen.

6. A diffractometer as claimed in claim 4 in which means are provided for translating the member rotatable about an axis parallel to the axis of rotation of the specimen to a parallel reciprocal lattice line.

7. A diffractometer as claimed in claim 6 in which means are provided for indexing and moving the member to parallel reciprocal lattice lines to scan the line for reflections.

8. A diffractometer as claimed in claim 7 in which means are provided for indexing the member to scan reciprocal lattice sites along a reciprocal lattice line.

9. A diffractometer as claimed in claim 2 in which the interconnected members are threaded, one of which is coupled to the radiation detector and the other of which is coupled to the specimen, and means are provided for moving the threaded members relative to each other in orthogonal directions.

10. A diffractometer as claimed in claim 9 in which the radiation detector is coupled to one of said threaded members by a member in which said threaded member can rotate and move said radiation detector coupling member relative to the other threaded member.

11. In a diffractometer, a rotatable support, a first arcuate member secured to a hollow shaft member journalled in and rotatable about an axis perpendicular to said support for carrying a detector moveable therealong, a second arcuate member secured to a second shaft member rotatable independently within said hollow shaft member about an axis perpendicular to the support, and a rotatable crystal holder moveable in orthogonal directions slideably secured to said second arcuate support.

12. In a diffractometer, a rotatable support, a first arcuate member secured to a hollow shaft member journalled in and rotatable about an axis perpendicular to said support for carrying a detector moveable therealong, a second arcuate member secured to a second shaft member rotatable independently within said hollow shaft member about an axis perpendicular to the support, and rotatable crystal holder slideably secured to said second arcuate support, said crystal holder including means to rotate said crystal about and to translate said crystal along mutually orthogonal axes.

13. In a diffractometer, a rotatable support, a first arcuate member secured to a hollow shaft member journalled in and rotatable about an axis perpendicular to said support for carrying a detector moveable therealong, a second arcuate member secured to a second shaft member rotatable independently within said hollow shaft member about an axis perpendicular to the support, and a rotatable crystal holder slideably secured to said second arcuate support, said crystal holder including means to rotate said crystal about and translate said crystal along mutually orthogonal axes and means to move said crystal along the axis of rotation.

14. In a diffractometer, a rotatable support, a first arcuate member along which a detector is slideable, means to rotate the first arcuate member about an axis perpendicular to the support, a second arcuate member, means to rotate said second arcuate member independently of said first arcuate member about an axis coincident with the axis of rotation of the first arcuate member, and rotatable crystal support means slideable along said second arcuate member.

References Cited in the file of this patent

UNITED STATES PATENTS

| | | |
|---|---|---|
| 2,540,821 | Harker | Feb. 6, 1951 |
| 2,648,011 | Good | Aug. 4, 1953 |
| 2,805,342 | Lang | Sept. 3, 1957 |
| 2,819,405 | Bond | Jan. 7, 1958 |
| 2,928,945 | Arndt et al. | Mar. 15, 1960 |
| 3,005,098 | Buschmann et al. | Oct. 17, 1961 |

OTHER REFERENCES

Clark: "Applied X-Rays," 4th edition, 1955, pages 368 to 371.

UNITED STATES PATENT OFFICE
CERTIFICATE OF CORRECTION

Patent No. 3,105,901                                    October 1, 1963

Joshua Ladell et al.

It is hereby certified that error appears in the above numbered patent requiring correction and that the said Letters Patent should read as corrected below.

Column 11, line 14, for "Cartesion" read -- Cartesian --; line 57, for "O'Z" read -- $\overline{O'Z}$ --; lines 72 to 74, in the formula, for "sin $\frac{Y_{max.}}{2}$" read -- sin $\frac{Y_{max.}}{2}$ --; column 13, line 12, after "over" insert -- a --; line 29, for "diflraction" read -- diffraction --.

Signed and sealed this 5th day of May 1964.

(SEAL)
Attest:

ERNEST W. SWIDER                                    EDWARD J. BRENNER
Attesting Officer                                      Commissioner of Patents